United States Patent [19]

Olsson

[11] Patent Number: 4,911,134
[45] Date of Patent: Mar. 27, 1990

[54] ARRANGEMENT FOR EJECTING FUEL IN A VEHICLE FUEL TANK

[75] Inventor: Göran Olsson, Finspång, Sweden
[73] Assignee: Saab-Scania Aktiebolag, Sweden
[21] Appl. No.: 224,053
[22] Filed: Jul. 25, 1988
[30] Foreign Application Priority Data Aug. 27, 1987 [SE] Sweden ................ 8703319

[51] Int. Cl.[4] .............. F02M 39/00; F02M 37/04
[52] U.S. Cl. .................... 123/514; 417/80; 137/895; 123/509
[58] Field of Search ........... 123/509, 514, 516, 510; 417/80, 151, 196; 137/895, 865, 590, 592

[56] References Cited

U.S. PATENT DOCUMENTS

| 2,674,189 | 4/1954 | Lung | 417/80 |
| 2,705,457 | 4/1955 | Levan | 417/80 |
| 3,367,269 | 2/1968 | Nelson | 417/80 |
| 3,729,273 | 4/1973 | Shimrony | 417/151 |
| 4,704,070 | 11/1987 | Iseman | 417/80 |
| 4,750,522 | 6/1988 | Griffin | 123/514 |

FOREIGN PATENT DOCUMENTS

| 8801346 | 2/1988 | European Pat. Off. | 123/514 |
| 2401728 | 7/1975 | Fed. Rep. of Germany | |
| 2453733 | 5/1976 | Fed. Rep. of Germany | |
| 2804550 | 8/1979 | Fed. Rep. of Germany | 123/514 |
| 2844053 | 4/1980 | Fed. Rep. of Germany | 123/509 |
| 3615214 | 11/1986 | Fed. Rep. of Germany | |
| 3631639 | 3/1987 | Fed. Rep. of Germany | |
| 3602155 | 7/1987 | Fed. Rep. of Germany | |
| 147286 | 10/1962 | U.S.S.R. | 417/80 |
| 0718618 | 2/1980 | U.S.S.R. | 123/514 |
| 844599 | 8/1960 | United Kingdom | |

Primary Examiner—Carl Stuart Miller
Attorney, Agent, or Firm—Ostrolenk, Faber, Gerb & Soffen

[57] ABSTRACT

An ejector in the fuel tank for transferring liquid fuel from the fuel tank to a fuel chamber in the fuel tank. The ejector comprises a housing with an inlet opening from the fuel tank laterally into the housing. An inlet channel for surplus engine fuel communicates into the ejector housing through a nozzle orifice outlet. An evacuation channel from the ejector housing has an inlet that is aligned with the nozzle orifice. The conicity of the ejector housing and of the inlet channel in the vicinity of the nozzle orifice is disclosed. The evacuation channel has an outlet that extends essentially tangentially into the free space inside the fuel chamber around the outside of a fuel pump therein.

17 Claims, 1 Drawing Sheet

ARRANGEMENT FOR EJECTING FUEL IN A VEHICLE FUEL TANK

BACKGROUND OF THE INVENTION

The present invention relates to an arrangement for a vehicle fuel tank, particularly to an ejector arrangement in the fuel tank which utilizes the kinetic energy of the surplus fuel of a vehicle engine in order to transfer fuel from the fuel tank to a fuel chamber arranged in the fuel tank. In the fuel chamber a fuel pump is accommodated, which ejector pump comprises a housing section which is connected to an inlet channel through which the surplus fuel is supplied to the ejector and an evacuation channel which is connected to the fuel chamber and is designed with at least one opening leading to the fuel tank.

In order to ensure that air does not enter the fuel system of a vehicle, it is known to arrange a special fuel chamber inside the fuel tank. The fuel chamber is supplied with fuel by a separate ejector. The actual fuel pump is accommodated in the fuel chamber in order to pump fuel further in the fuel system. The fuel pump is designed to pump more fuel to the vehicle engine than is consumed in the combustion process in the engine. The resulting surplus fuel is returned to the fuel chamber while its kinetic energy is utilised in order to suck fuel, using the ejector, from the fuel tank to the fuel chamber.

Known ejector arrangements have a number of disadvantages. For example, in German Patent Specification DE 36 15 214, the surplus fuel is allowed to flow in a more or less uncontrolled manner past the inlet opening of an ejector at such low kinetic energy that the surplus fuel can barely give rise to a sufficiently great suction effect for the fuel chamber to be supplied with a sufficient amount of fuel. In German Patent Specification DE 24 01 728 there is a space between the nozzle of an ejector and an intake pipe. The effect of the ejector is impaired in this arrangement since the fuel splashing around in the fuel tank is allowed to penetrate into the said space and impair the suction capacity of the ejector.

SUMMARY OF THE INVENTION

The object of the present invention is to eliminate the above mentioned disadvantages. For this purpose the invention is characterised by the fact that the evacuation channel extends into the fuel chamber and empties into a free space between the fuel pump and the wall of the fuel chamber.

The arrangement according to the invention comprises relatively simple and inexpensive parts which ensure that the fuel chamber is constantly supplied with a sufficient amount of fuel from the fuel tank and which ensure that the fuel splashing around does not impair the suction capacity of the ejector.

Other features characterising the invention appear in the following description of an embodiment illustrating the invention. In the description reference is made to the attached figures.

DESCRIPTION OF A PREFERRED EMBODIMENT

Figure 1:
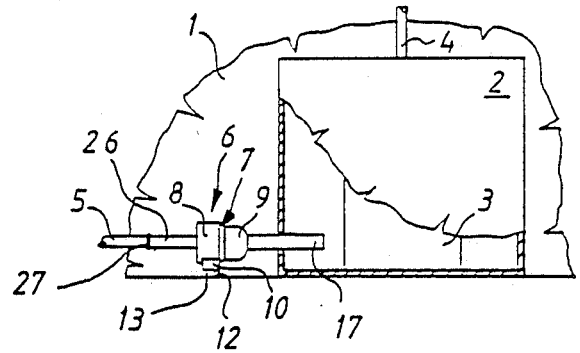
FIG. 1 shows a schematic side view of the fuel tank in which an arrangement according to the invention is arranged.
Figure 2:
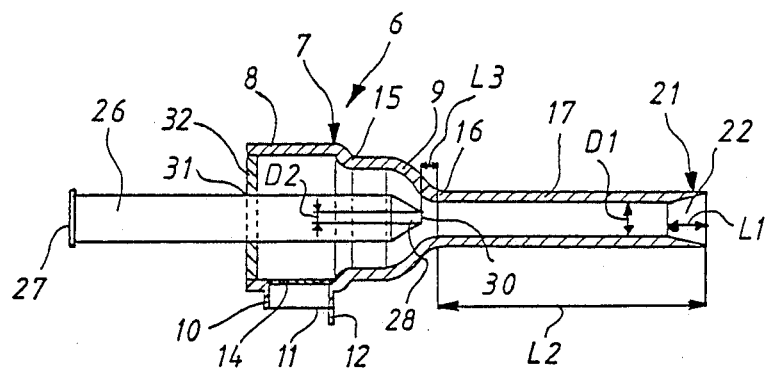
FIG. 2 shows a side view of the arrangement according to the invention.
Figure 3:
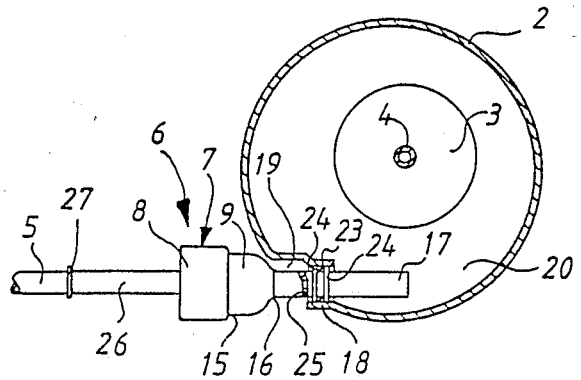
FIG. 3 shows a plan view of the arrangement according to the invention when assembled in a fuel chamber.

FIG. 1 shows schematically a fuel tank 1 in which a fuel chamber 2 is arranged. A fuel pump 3 is accommodated in the fuel chamber 2 in order to pump fuel via a fuel line 4 to an internal combustion engine (not shown). The fuel pump 3 is designed to pump more fuel to the internal combustion engine than is consumed in the combustion process in the engine. The resulting surplus fuel is pumped back to the fuel chamber 2 via a fuel return line 5 and an ejector 6.

The ejector 6 comprises an ejector housing 7 which consists of two parts, 8, 9.

The first part 8 of the ejector housing 7 is cylindrical and designed with a channel 10 of rectangular cross section leading to the fuel tank 1. The open end 11 of the channel 10 is designed with downwardly-directed pin-shaped spacing elements 12 which bear against the bottom of the fuel tank 1 and define a gap 13 through which fuel is supplied to the ejector 6. That opening of the channel 10 which is directed towards the ejector housing 7 is provided with a filter 14, preferably of fine-meshed wire net, for preventing any free particles in the fuel from being sucked into the ejector 6.

The second part 9 of the ejector housing 7 is conical and its diametrically larger end 15 is connected to the cylindrical part 8, while its diametrically smaller end 16 is connected to a tubular evacuation channel 17.

Both the transition between the cylindrical part 8 and the conical part 9 and the transition between the conical part 9 and the evacuation channel 17 are rounded off in order to avoid flow losses in the ejector 6.

The ejector channel 17 passes through a collar section 18, which is arranged in an outer recess 19 in the wall of the fuel chamber 2, and it extends by more than half its length into the fuel chamber essentially tangentially in relation to the fuel pump 3. The evacuation channel 17 leads into a free space between the fuel pump 3 and the cylindrical outer wall of the fuel chamber 2. The nozzle 21 of the evacuation channel 17 is in this connection designed with a conical expansion space 22 whose length L1 is at least 1/10 of the length L2 of the evacuation channels 17. In addition, the length L2 of the evacuation channel 17 is at least greater than about five times the inner diameter D1 of the evacuation channel 17 and is advantageously greater than or equal to seven and less than ten, times the said inner diameter D1.

A sealing ring 23 bears against the evacuation channel 17 and against the collar section 18. The sealing ring 23 is axially fixed between two radially outwardly directed flanges 24 on the evacuation channel 17.

The evacuation channel 17 is designed with a number of connecting elements 25 by means of which the ejector 6 is fixed to the fuel chamber 2. The connecting elements 25 are made up of locking heads (not described in detail) which interact in a locking manner with heads on the collar section 18 which correspond to the locking heads.

The ejector also comprises an inlet channel 26, one end 27 of which is connected to the fuel return line 5 and the other end, of which is provided with a throttling 28. The inlet channel 26 is advantageously a tubular element which, at its one end is designed with a converging section having a nozzle orifice 30. The outer conicity of the converging section is less than the conicity of the conical inner part 9 on the ejector housing 7 and the diameter D2 of the nozzle orifice 30 is advantageously 0.3–0.6 times the diameter D1 of the evacuation channel 17 and preferably about 0.4 times the said diameter D1.

The inlet channel 26 and evacuation channel 17 are arranged in series in the longitudinal direction of the ejector 6. The inlet channel 26 thus passes through an opening 31 in a wall 32, which delimit the ejector housing 7 towards the rear, and is introduced so far into the ejector housing 7 that its throttling 28 empties between the nozzle over the evacuation channel 17 and the opening 10 leading to the fuel tank 1. The distance L3 between the throttling 28 and the evacuation channel 17 is about 0.8–3.5 times the diameter D2 of the nozzle orifice 30 of the throttling 28 and is advantageously about 2.0 times the said diameter D2.

The arrangement described according to the invention operates as follows.

The fuel pump 3 pumps fuel from the fuel chamber 2 via the fuel line 4 to the internal combustion engine (not shown). The surplus fuel from the internal combustion engine flows through the fuel return line 5, through the inlet channel 26, and out through the nozzle orifice 30 over the throttling 28 as a controlled jet of fuel. At the same time, due to the ejector action resulting from the flow of fuel, fuel is sucked from the fuel tank 1 via the channel 10 and into the ejector housing 7. The surplus fuel and the fuel from the fuel tank 1 are then fed to the fuel chamber 2 via the evacuation channel 17.

The invention should not be regarded as being limited by the described embodiment, but can rather be modified in a number of alternative embodiments within the scope of the following basic claims.

I claim:

1. Arrangement for ejecting fuel inside a fuel tank comprising:
   (a) a fuel chamber to which liquid fuel from the fuel tank is to be transferred; the fuel chamber being disposed in the fuel tank and having a peripheral wall defining the fuel chamber;
   (b) a fuel pump in the fuel chamber disposed inwardly from the peripheral wall;
   (c) an ejector comprising:
      (i) an ejector housing;
      (ii) an inlet channel to the ejector housing through which surplus fuel is supplied to the ejector housing, a throttling being defined in the inlet channel and comprising a converging section of the inlet channel that converges narrower in the flow path of the inlet channel, and the inlet channel having a nozzle-orifice outlet therefrom into the ejector housing;
      (iii) an evacuation channel from the ejector housing, the evacuation channel having a first part positioned inside the fuel chamber and a second part positioned outside the fuel chamber, said first part extending into a free space in the fuel chamber between the fuel pump and the peripheral wall of the fuel chamber; and
      (iv) the ejector housing having an interior with a conically-narrowing part around the inlet channel in the region of the nozzle orifice, and the throttling of the inlet channel emptying into the conically-narrowing part of the ejector housing;
   (d) at least one opening communicating from the fuel tank into the ejector housing outside the inlet channel for delivering fuel thereto, said opening being directed downwardly toward a bottom part of the fuel tank; and
   (e) spacing elements being fixed in relation to the ejector housing for contacting the fuel tank bottom and spacing the housing away from the bottom for permitting fuel passage into the opening.

2. Arrangement for ejecting fuel inside a vehicle fuel tank comprising:
   (a) a fuel chamber to which liquid fuel from the fuel tank is to be transferred; the fuel chamber being disposed in the fuel tank and having a peripheral wall defining the fuel chamber;
   (b) a fuel pump in the fuel chamber disposed inwardly from the peripheral wall;
   (c) an ejector comprising:
      (i) an ejector housing;
      (ii) an inlet channel to the ejector housing through which surplus fuel is supplied to the ejector housing, a throttling being defined in the inlet channel and comprising a converging section of the inlet channel that converges narrower in the flow path of the inlet channel, and the inlet channel having a nozzle-orifice outlet therefrom into the ejector housing;
      (iii) an evacuation channel from the ejector housing, the evacuation channel having a first part positioned inside the fuel chamber and a second part positioned outside the fuel chamber, said first part being more than half of the evacuation channel length and having an outlet extending into a free space in the fuel chamber between the fuel pump and the peripheral wall of the fuel chamber; and
      (iv) the ejector housing having an interior with a conically-narrowing part around the inlet channel in the region of the nozzle orifice, and the throttling of the inlet channel emptying into the conically-narrowing part of the ejector housing;
   (d) at least one opening communicating from the fuel tank into the ejector housing outside the inlet channel for delivering fuel thereto, said opening being directed downwardly toward a bottom part of the fuel tank; and
   (e) the evacuation channel having an inlet in the ejector housing, said inlet being spaced apart from and in series with the inlet channel outlet and the ejector housing opening in the longitudinal direction of the ejector housing.

3. The arrangement according to claim 1, wherein the outlet from the evacuation channel extends into the fuel chamber essentially tangentially in relation to the fuel pump in the fuel chamber.

4. The arrangement of claim 3, wherein the evacuation channel has a length from the ejection housing to the outlet end thereof and the evacuation channel extends by more than half its length into the fuel chamber.

5. The arrangement of claim 3, wherein the peripheral wall of the fuel chamber is essentially circular and the fuel chamber is essentially cylindrical in shape.

6. The arrangement of claim 1, further comprising a collar developed in the peripheral wall of the fuel chamber, the collar being shaped for receiving the evacuation channel and having the evacuation channel pass through the collar into the fuel chamber.

7. The arrangement of claim 6, further comprising a recess defined in the peripheral wall of the fuel chamber, the recess being shaped for receiving the collar.

8. The arrangement of claim 6, wherein the evacuation chamber has an evacuation space toward the outlet thereof, and the evacuation space conically widens toward the outlet from the evacuation channel; the evacuation space having a length along the evacuation channel which is at least 0.1 times the length of the evacuation channel.

9. The arrangement of claim 8, wherein the evacuation channel has an inner diameter and has a length therealong, and the length of the evacuation channel is at least seven times the inner diameter of the evacuation channel.

10. The arrangement of claim 6, wherein the evacuation channel has an inner diameter and has a length therealong, and the length of the evacuation channel is at least seven times the inner diameter of the evacuation channel.

11. The arrangement of claim 1, wherein the opening communicating from the fuel tank to the ejector housing comprises a channel into the housing from the fuel tank, said channel being covered by a filter.

12. The arrangement of claim 1, wherein the evacuation channel has an inlet in the ejector housing, the nozzle orifice outlet from the inlet channel and the inlet to the evacuation channel are spaced apart and arranged in series in the longitudinal direction of the ejector housing; the distance between the nozzle orifice and the inlet to the evacuation channel in the ejector housing is 0.8–3.5 times the diameter of the nozzle orifice, and the diameter of the nozzle orifice is 0.3–0.6 times the inner diameter of the evacuation channel.

13. The arrangement of claim 1, wherein the conically-narrowing part of the ejector housing has a conicity greater than the conicity of the converging section of the inlet channel.

14. The arrangement of claim 1, wherein said one opening communicating from the fuel tank into the ejector housing comprises the only opening of its kind.

15. The arrangement of claim 14, wherein said spacing elements depend directly from the ejector housing and rest on the fuel tank bottom so as to define a gap between the ejector housing and the fuel tank bottom, said gap being small in relation to a maximum height of the ejector housing.

16. The arrangement of claim 2, wherein said one opening communicating from the fuel tank into the ejector housing comnprises the only opening of its kind.

17. The arrangement of claim 16, wherein said spacing elements depend directly from the ejector housing and rest on the fuel tank bottom so as to define a gap between the ejector housing and the fuel tank bottom, said gap being small in relation to maximum height of the ejector housing.

* * * * *